(12) United States Patent
Szeglin et al.

(10) Patent No.: US 11,305,684 B1
(45) Date of Patent: Apr. 19, 2022

(54) CARGO SECURING SYSTEMS WITH SYNTHETIC TIEDOWN CHAINS

(71) Applicant: Peck & Hale, L.L.C., West Sayville, NY (US)

(72) Inventors: John L. Szeglin, Sayville, NY (US); Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 135 days.

(21) Appl. No.: 16/700,163

(22) Filed: Dec. 2, 2019

Related U.S. Application Data

(60) Provisional application No. 62/774,263, filed on Dec. 2, 2018.

(51) Int. Cl.
*B60P 7/08* (2006.01)

(52) U.S. Cl.
CPC .................... *B60P 7/0823* (2013.01)

(58) Field of Classification Search
CPC ......... B60P 7/0823; B60P 7/0838; B60P 7/06; B60P 7/08; Y10T 24/2175; Y10T 24/2177
USPC ........................................................ 410/100
See application file for complete search history.

(56) References Cited

U.S. PATENT DOCUMENTS

| | | | |
|---|---|---|---|
| 2,028,528 A * | 1/1936 | Sipe | F16B 19/02 411/455 |
| 2,560,695 A * | 7/1951 | Huber | B60P 7/0823 410/23 |
| 2,777,668 A * | 1/1957 | Huber | B60P 7/083 24/68 CD |
| 2,824,717 A | 2/1958 | Yeager | |
| 2,848,777 A * | 8/1958 | Huber | F16B 45/02 24/601.5 |
| 2,935,300 A * | 5/1960 | Elsner | F16G 11/12 254/199 |
| 3,271,007 A | 9/1966 | Ratcliff | |
| 3,591,141 A | 7/1971 | Ratcliff | |
| 4,136,494 A | 1/1979 | Jameson | |
| 4,422,218 A | 12/1983 | Brasseux | |
| 4,500,073 A | 2/1985 | Smith | |
| 4,606,096 A | 8/1986 | Wood | |
| 4,977,646 A | 12/1990 | McCraw | |
| 5,429,462 A | 7/1995 | Anderson | |
| 6,141,836 A | 11/2000 | Thornton | |
| 6,425,339 B1 | 7/2002 | Furlong | |
| 6,477,747 B1 | 11/2002 | Flagg | |
| 7,065,840 B2 | 6/2006 | Profit | |
| 7,575,403 B2 * | 8/2009 | Hsieh | F16B 7/06 410/100 |
| 7,913,363 B2 | 3/2011 | Scott | |
| 8,468,793 B2 | 6/2013 | Wienke et al. | |
| 8,491,237 B2 | 7/2013 | Parkinson | |
| 8,668,417 B2 | 3/2014 | Harrigan | |
| 8,978,350 B2 | 3/2015 | Betzler et al. | |
| 9,046,152 B2 | 6/2015 | Kimura | |
| 9,102,259 B2 | 8/2015 | Brewster | |

(Continued)

*Primary Examiner* — Hilary L Gutman
(74) *Attorney, Agent, or Firm* — Schroeder Law PC

(57) ABSTRACT

A cargo securing system which incorporates synthetic chains in a manner which addresses the increased pitch of the synthetic link and the increased elongation of the synthetic chain, while still allowing the usage of conventional prior art load binders in a timely and safe manner. The system includes a length-adjusting coupling device for connecting a load binder to a section of chain.

5 Claims, 8 Drawing Sheets

(56) References Cited

U.S. PATENT DOCUMENTS

| | | | |
|---|---|---|---|
| 9,242,592 B1 | 1/2016 | Meszaros | |
| 9,328,800 B2 | 5/2016 | Pengg et al. | |
| 9,404,558 B2 | 8/2016 | Wienke et al. | |
| 9,453,557 B2 | 9/2016 | Chou | |
| 9,669,753 B1* | 6/2017 | Royt | B60P 7/0823 |
| 9,670,987 B1 | 6/2017 | Stolz | |
| 9,816,585 B1 | 11/2017 | Dreixler et al. | |
| 9,884,581 B1* | 2/2018 | Royt | B60P 7/0838 |
| 9,976,627 B2 | 5/2018 | Brodziak | |
| 2016/0281820 A1 | 9/2016 | Wienke et al. | |
| 2016/0305506 A1 | 10/2016 | McNeilly | |
| 2017/0182927 A1* | 6/2017 | Brewster | B60P 7/0853 |
| 2018/0127900 A1 | 5/2018 | Bosman et al. | |
| 2021/0131526 A1* | 5/2021 | Squires | G01L 5/047 |

\* cited by examiner

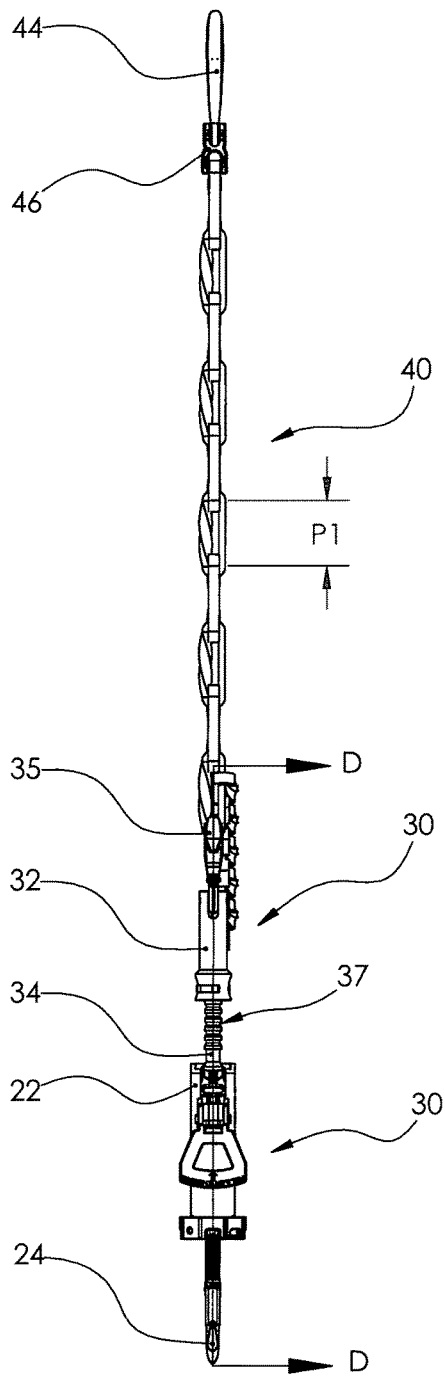
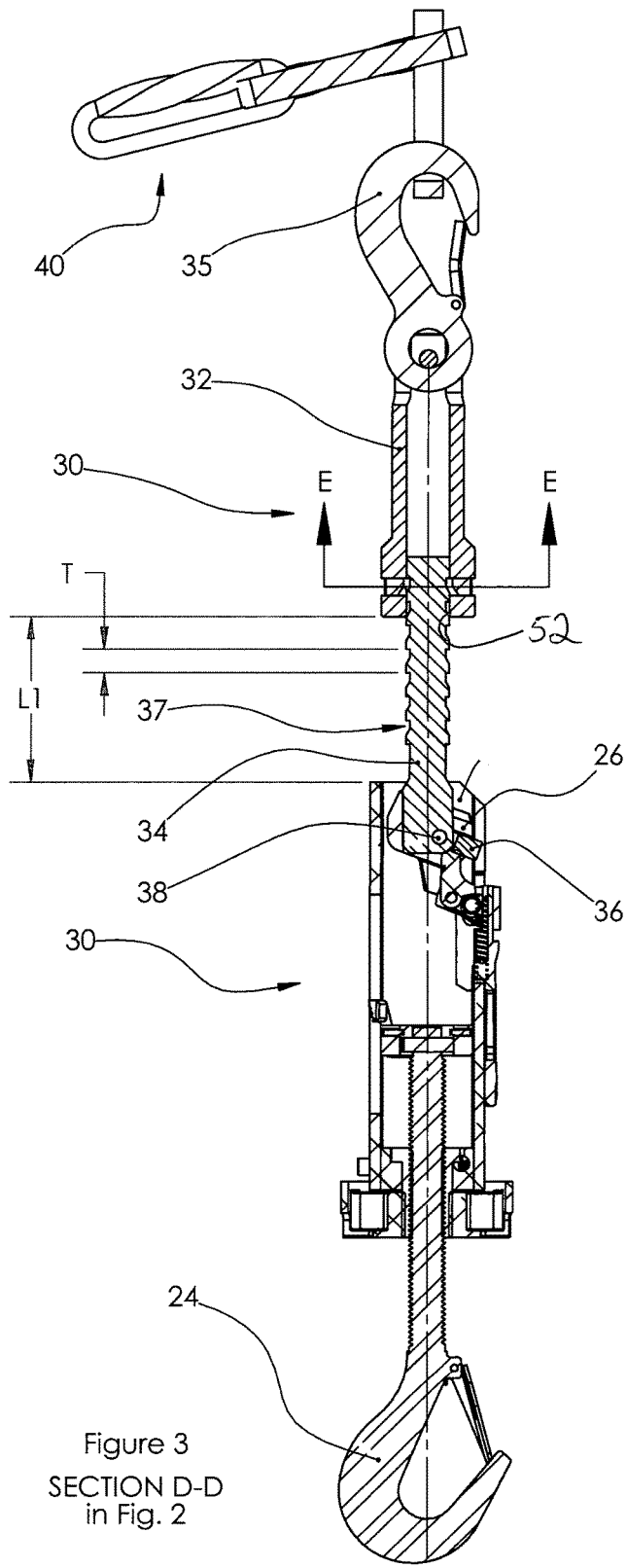
Figure 2
VIEW A in Fig. 1
Figure 3
SECTION D-D
in Fig. 2

Detail B in Fig. 1

SECTION E-E in Fig. 3

Detail B in Fig. 1. Elements of assembly 10 are hidden for clarity

Detail B in Fig. 1. Elements of assembly 10 are hidden for clarity

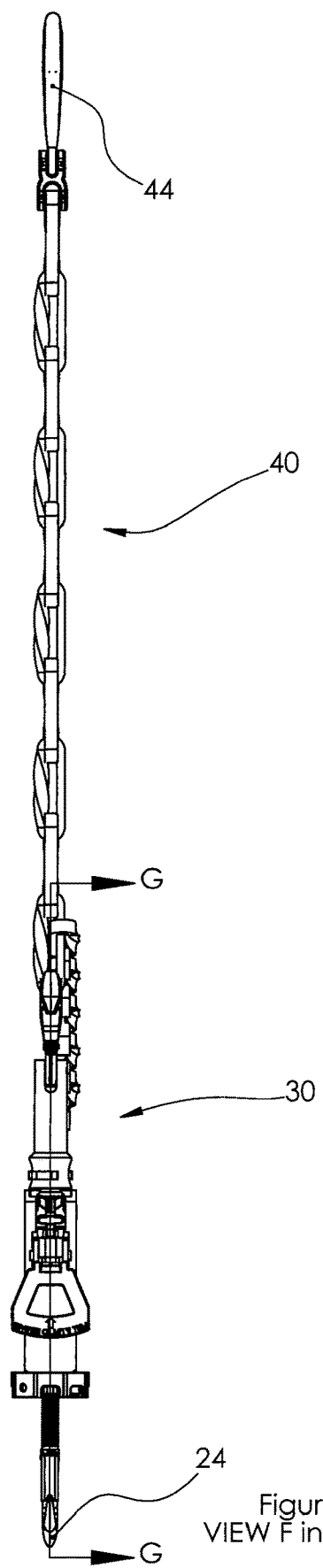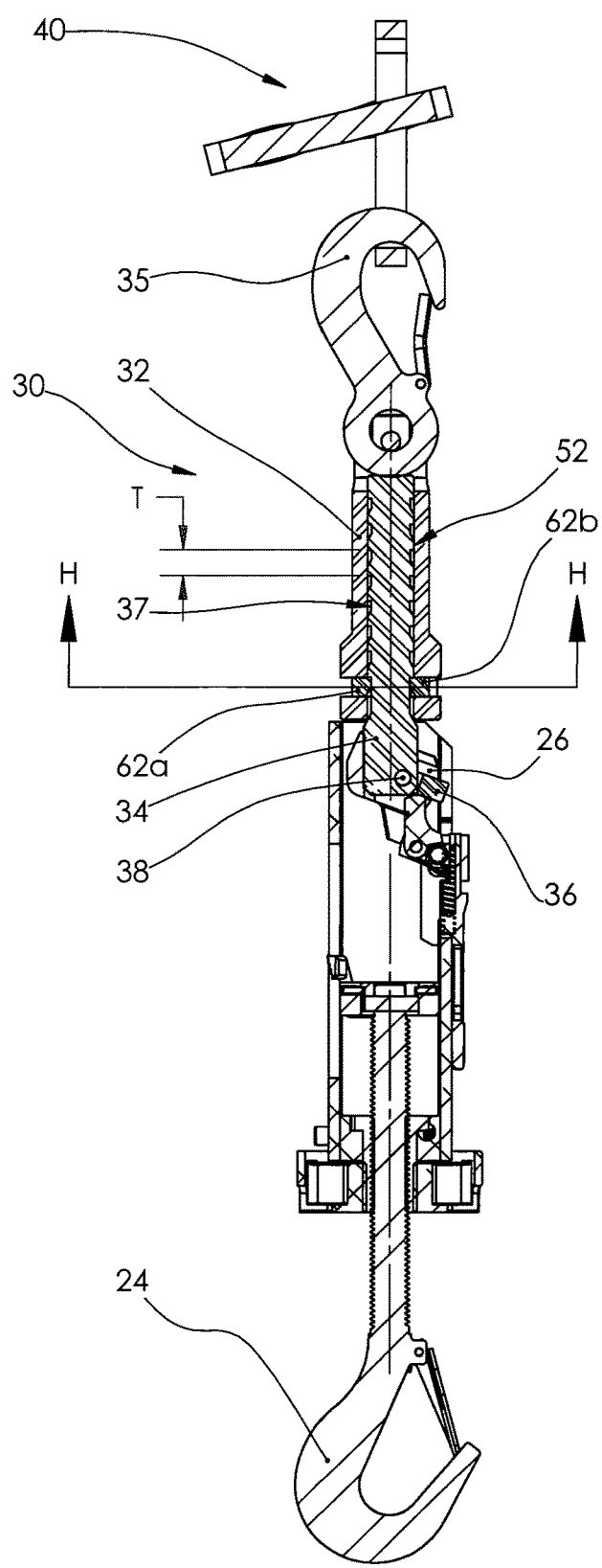
Figure 6
VIEW F in Fig. 4b
Figure 7
SECTION G-G in Fig. 6

SECTION H-H
in Fig. 7

DETAIL I in Fig. 9

DETAIL J in Fig. 11

CARGO SECURING SYSTEMS WITH SYNTHETIC TIEDOWN CHAINS

BACKGROUND OF THE INVENTION

The present invention relates to the use of synthetic tiedown chains for securing cargo and, more particularly, to cargo securing systems using synthetic tiedown chains with conventional load binders.

The prior art includes various devices which are used for securing cargo that has been loaded on open top railcars, trailers, decks of vessels, into aircraft bodies, and containers. The term "open top" refers to freight cars, intermodal trailers, and containers that are not enclosed—and thus potentially expose the cargo to the environment.

Steel tiedown chain assemblies are often used to secure cargo in all three directions—longitudinal, lateral, and vertical. To ensure that the load does not move or shift, restraint values must be observed per the rules utilized in that particular transportation industry. For example, typical restraint requirements for rail road transportation are: longitudinal direction—three times the weight from each side of the load; lateral direction—two times the weight from each side of the load; and vertical direction—two times the weight.

The prior art includes steel chains and at least three types of load binders for use in securement of heavy loads—ratchet type, turnbuckle type, and lever type. As will be recognized by those skilled in the art, ratchet type binders, such as the device disclosed in U.S. Pat. No. 9,102,259, are i) adapted to adjust a preliminary tension within small intervals defined by the pitch of a ratchet gear; ii) are the least productive; and iii) are not well-suited for applications with limited time for loading/unloading. Turnbuckle type binders, such as the device disclosed in U.S. Pat. No. 8,491,237, are i) adapted to adjust force continuously without any intervals; ii) but require extra operational space for handle rotation in the plane perpendicular to the line of tension; and iii) also are not well-suited for applications with limited time for loading/unloading. Finally, lever type adjustable binders are i) adapted to operate in harsh environments; and ii) are preferred in applications with limited time for loading/unloading.

Those skilled in the art will appreciate that the prior art securing systems, particularly the steel chains, become exceptionally heavy and cumbersome when such chains are sized to secure extra heavy or extra large cargo. This of course increases the time and difficulty of properly securing such extra heavy or extra large cargo.

In or about 2015, DSM introduced a new fiber made of UHMWPE fiber (ultra-high molecular weight polyethylene) under the brand name Dyneema. The product is marketed by DSM as being the strongest most durable lightweight fiber in the world, and as being 15 times stronger than steel, yet light enough to float on water. Webbing is made from textile strips of Dyneema. In turn, the webbing is wound to form synthetic chain links which, when sewn together, provide the synthetic tiedown chain (see e.g., U.S. Pat. Nos. 9,404,558; 8,468,793; U.S. Publication Nos. 2016/0281820; 2018/0127900).

Although the new synthetic tiedown chains (also referred to herein as a "synthetic chain") offer potentially significant advantages (e.g., improved strength/weight ratio, improved fatigue resistance, increased life expectancy) over conventional metal chains, there are nonetheless several obstacles which must be addressed before replacing a steel chain with a synthetic chain.

First, the current manufacturing techniques for synthetic chains made from Dyneema fiber necessitate a minimum size for the resultant textile loop. More specifically, the resultant synthetic links have a pitch of approximately 4 inches—which is 3 to 5 times larger than the pitch of a conventional steel chain of the same strength. Those skilled in the art will immediately understand that the increased pitch will require the use of a new binder having a significantly greater stroke which results in a heavier and more expensive assembly, and which also significantly hinders/delays the securing of cargo as compared to installations using steel chains. In particular, the operator will be required to first eliminate the extra slack in the synthetic chain from the increased pitch (which could be up to 4 inches).

Second, synthetic chains typically have about 3.5% to 4% elongation under load—as compared to almost 0% elongation for steel chains. This fact additionally contributes to the time/skill required for an operator to properly secure a cargo load because it is necessary to consider and address the elongation under load to ensure that the required preliminary tension force is achieved.

Third, the hooks of various prior art binders (see e.g., U.S. Pat. No. 9,453,557; U.S. Publication No. 2016/0305506) will require an extra space of 1.5 to 2 inches to reach the desired synthetic link—thus further increasing the preliminary slack in the tiedown chain. Other known clutches (see e.g., U.S. Pat. Nos. 9,976,627; 9,816,585; 9,670,987; 9,328,800; 9,046,152; 8,978,350) used to tension tiedown chains will require additional operator time when used with synthetic chains.

Fourth, some military assemblies for aircrafts require the option for immediate release under tension load. Currently-available securing systems utilizing synthetic chains cannot provide this immediate release possibility.

Finally, currently-available securing systems utilizing synthetic chains typically include modified turnbuckle or ratchet-type binders with strokes 2-3 times greater than conventional binders used for steel chains. As expected, these modified binders increase the weight and cost of the assembly, while also significantly increasing the time for the cargo securing operation.

There is therefore a need in the art for a cargo securing system which incorporates synthetic chains in a manner which addresses the increased pitch of the synthetic link and the increased elongation of the synthetic chain, while still allowing the usage of conventional prior art load binders in a timely and safe manner. There is a further need in the art for a length-adjusting coupling device for connecting a conventional load binder to a synthetic chain in a timely and safe manner during cargo securement. Finally, there is a need in the art for a shortening chain assembly for connecting a conventional load binder to a synthetic chain in a timely and safe manner during cargo securement.

SUMMARY OF THE INVENTION

The present invention, which addresses the needs of the prior art, relates to a length-adjusting coupling device for connecting a load binder to a section of chain. The load binder includes a chain-engaging notch. The coupling device includes: a) an elongate tubular body having first and second ends; b) a hook connected to the first end of the elongate body; c) an adjustable leg having first and second ends and being sized to telescopically travel within the elongate body, the first end of the leg including an attachment lug configured to engage the chain-engaging notch of the load binder; and d) a locking mechanism for fixing the leg with respect to the body at a plurality of telescoped orientations and for transferring loads from the hook to the attachment lug.

The present invention further relates to a kit of parts for securing a cargo load to a transportation surface of a vessel using a load binder. The kit of parts includes: a) a tiedown chain assembly, the tiedown chain assembly including: i) a length of synthetic chain formed of individual links, each of the links having a pitch of P1 inches, the synthetic chain having first and second ends; and ii) a hook secured to the first end of the synthetic chain; and, b) a shortening chain assembly, the shortening chain assembly including: i) a length of metal chain formed of individual metal links, each of the metal links having a pitch of P2 inches, the metal chain having first and second ends; and ii) a hook connected to the first end of the metal chain; and wherein pitch P2 is less than pitch P1.

As a result, the present invention provides a cargo securing system which incorporates synthetic chains in a manner which addresses the increased pitch of the synthetic link and the increased elongation of the synthetic chain, while still allowing the usage of conventional prior art load binders in a timely and safe manner. The present invention further provides a length-adjusting coupling device for connecting a conventional load binder to a synthetic chain in a timely and safe manner during cargo securement. Finally, the present invention provides a shortening chain assembly for connecting a conventional load binder to a synthetic chain in a timely and safe manner during cargo securement.

BRIEF DESCRIPTION OF THE DRAWINGS

FIG. 2 is a top view of the cargo securing system of FIG. 1.

FIG. 3 is a cross-sectional view taken through lines D-D of FIG. 2.

FIG. 6 is a top view of the cargo securing system of FIG. 1 after the initial slack has been removed/minimized from the chain.

FIG. 7 is a cross-sectional view taken through lines G-G of FIG. 6.

DETAILED DESCRIPTION OF THE INVENTION

Figure 1:
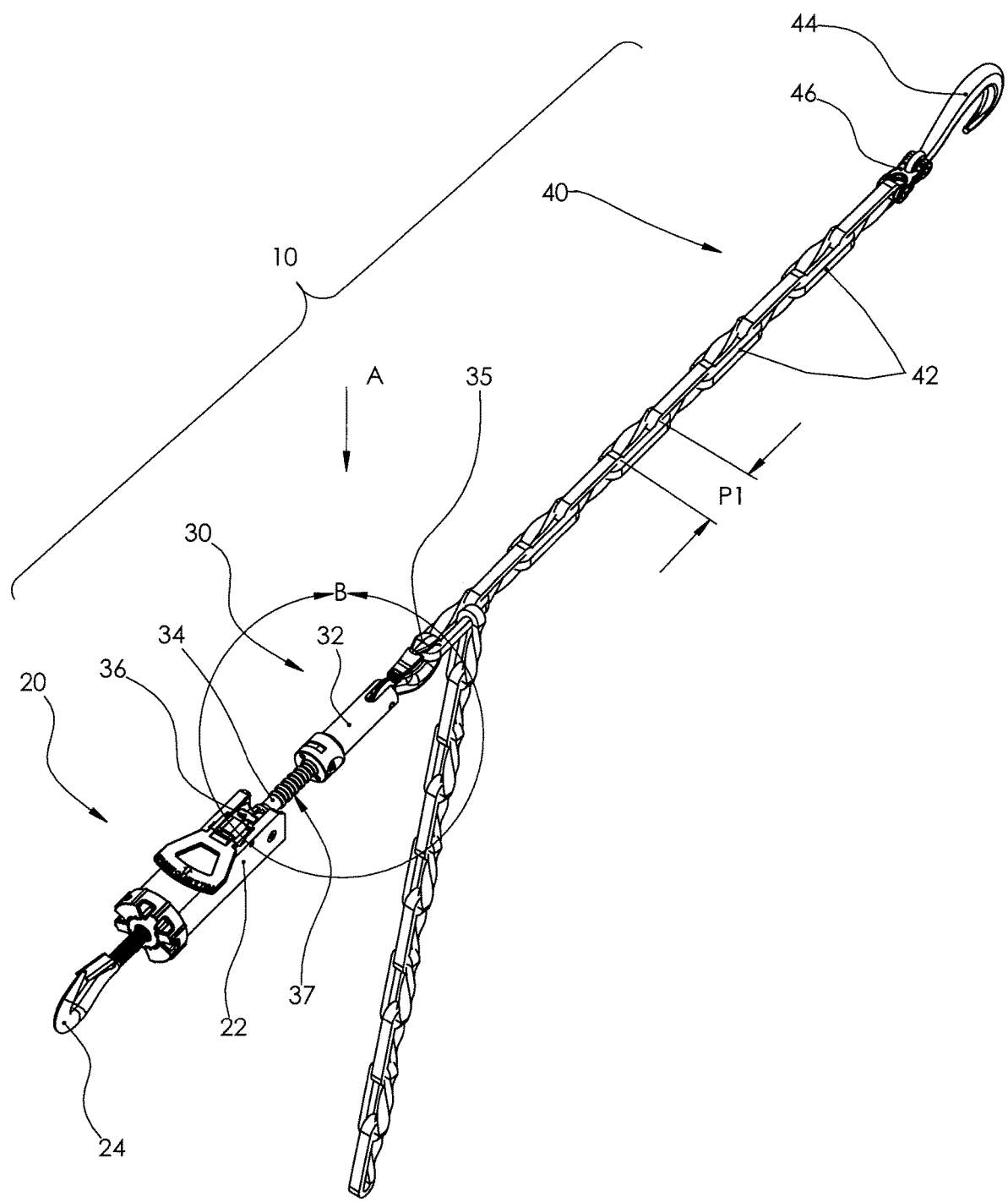
FIG. 1 is a perspective view of the initial installation position of a cargo securing system of the present invention.

FIGS. 1-3 show a cargo securing system 10 formed in accordance with a first embodiment of the present invention. System 10 utilizes a conventional load binder 20 (e.g., a turnbuckle-type) having a body 22 and a hook 24. Body 22 includes a chain-engaging pocket 26 (best seen in FIG. 3) for receiving the securing end of a tiedown member, e.g., a link of a conventional metal tiedown chain. In one preferred embodiment, hook 24 is rotatable with respect to body 22. Cargo securing system 10 further includes a novel length-adjusting coupling device 30 having an elongate tubular body 32, an adjustable leg 34 sized to telescopically travel within tubular body 32, and a hook 35. Adjustable leg 34 includes an attachment lug 36 configured to engage said chain-engaging pocket 26 of said load binder 20. In one preferred embodiment, hook 35 is pivotably connected to tubular body 32. Cargo securing system 10 additionally includes a length of synthetic chain 40 formed of individual links 42. In one preferred embodiment, a hook 44 is attached to one end of chain 40 via a coupler 46. Each individual link 42 of synthetic chain 40 has a pitch P1. Hook 35 of coupling device 30 is shown secured to an individual link 42 of synthetic chain 40. As will be explained further hereinbelow, cargo securing system 10 is shown in an initial installation position in FIGS. 1-3 wherein synthetic chain 40 may include slack.

Figure 4:
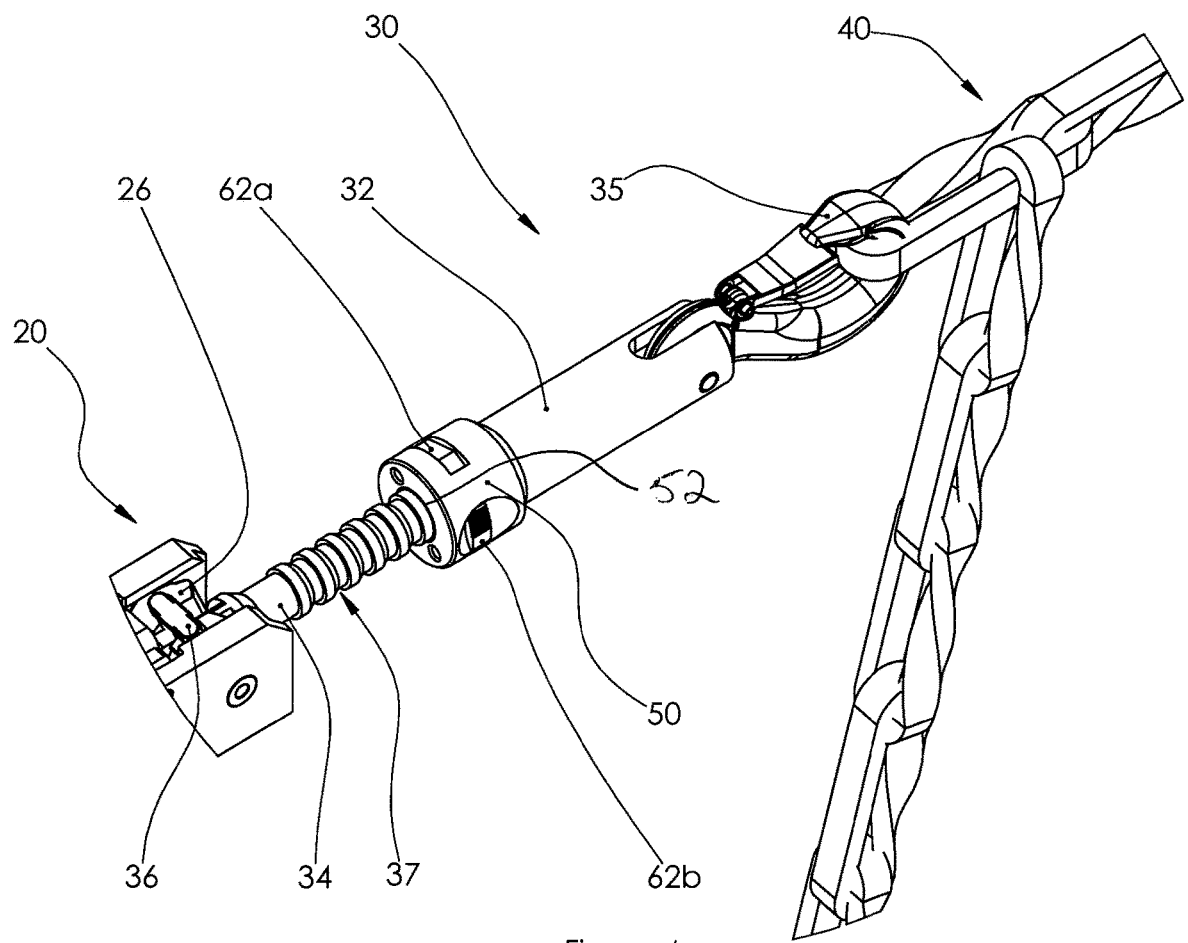
FIG. 4 is an enlarged detail taken from FIG. 1.
Figure 4A:
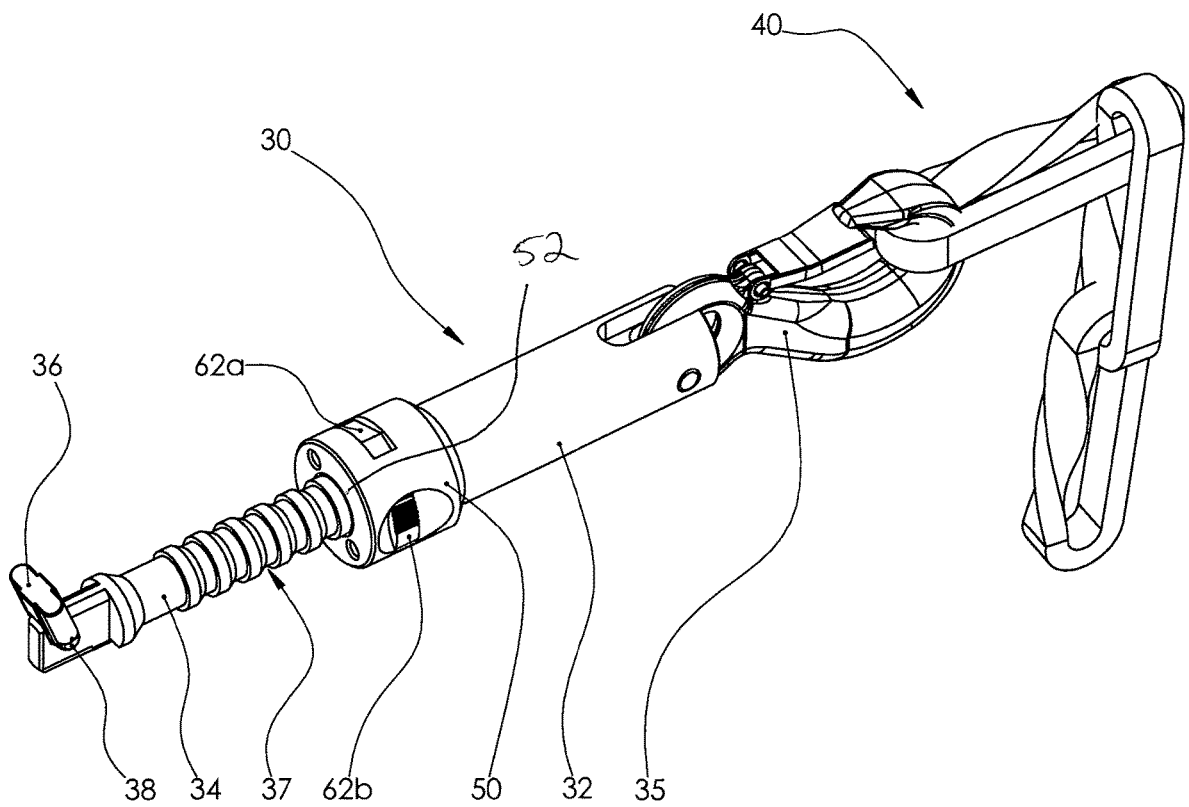
FIG. 4a is an enlarged detail taken from FIG. 1 showing the adjustable leg in a lengthened orientation and with elements of the load binder removed for clarity.
Figure 4B:
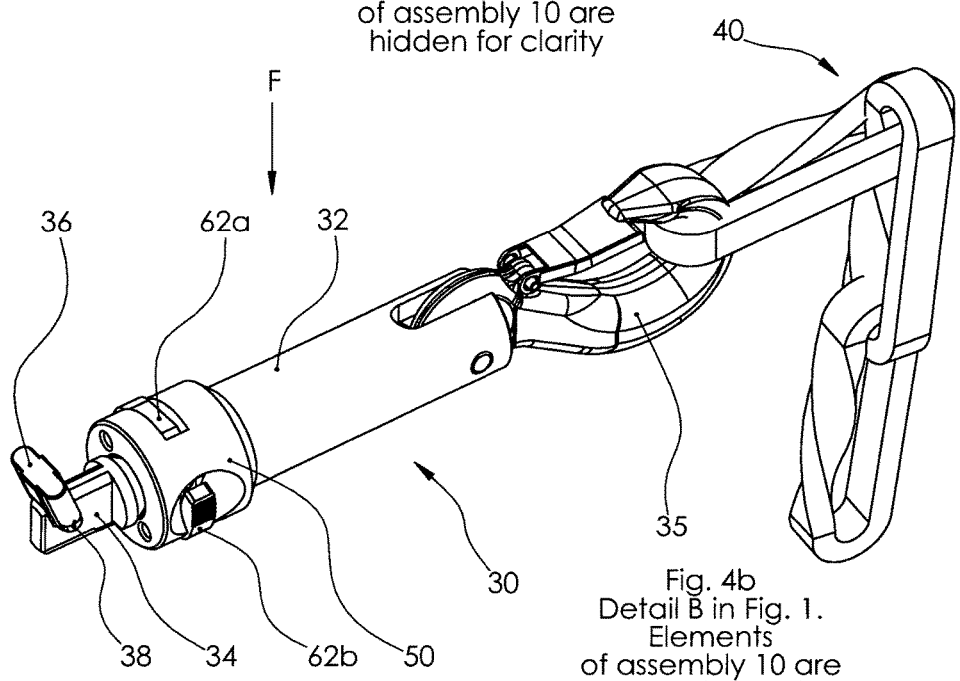
FIG. 4b is a view similar to FIG. 4a showing the adjustable leg in a shortened orientation.

As best seen in FIGS. 4-4b, adjustable leg 34 includes a plurality of locking stops, i.e., grooves 37. In one preferred embodiment, grooves 37 are evenly spaced along the length of adjustable leg 34 with a spacing of distance T therebetween (see FIG. 3). In one preferred embodiment, grooves 37 are formed to circumferentially-surround adjustable leg 34. As mentioned, adjustable leg 34 is sized and configured to telescopically travel within tubular body 32 of coupling device 30. Attachment lug 36 is preferably pivotably connected to adjustable leg 34 via a pin 38.

Adjustable leg 34 is shown in its fully extended orientation in FIG. 4a, and is shown in its fully retracted orientation in FIG. 4b. It has been discovered herein that the use of the novel coupling device 30 with its adjustable leg allows an operator to quickly address the increased pitch and elongation issues associated with synthetic chains, while following all securing and safety procedures. Specifically, coupling device 30 can be connected between a link of a synthetic chain and a conventional load binder. The initial connection is performed with the adjustable leg in the extended orientation shown in FIG. 4a. Once the initial connection is performed, the operator can grasp coupling device 30 and pull coupling device 30 towards load binder 20, which causes adjustable leg 34 to retract within tubular body 32 as shown in FIG. 4b. Of course, this same action also causes synthetic chain 40 to be pulled taught, thereby removing any slack in the chain. If necessary and/or desired, the operator can then use the available features of the conventional load binder to further pre-tension the chain.

It has been discovered herein that the distance L1 (see FIG. 3) corresponding to a full stroke of adjustable leg 34 is preferably equal to or slightly greater than pitch P1. It has been further discovered herein that distance T is preferably equal to or less than one fourth of P1. In operation, hook 24 may be attached to a first termination point (e.g., on the transportation vessel), while hook 44 may be attached to a second termination point (e.g., on or near the cargo load).

Figure 5:
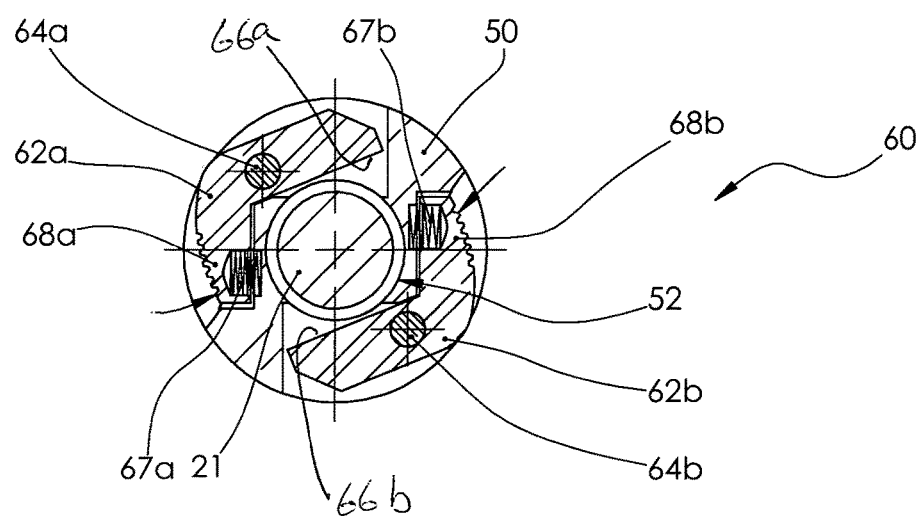
FIG. 5 is a cross-sectional view taken through lines E-E of FIG. 3.

Referring now to FIGS. 4 and 5, coupling device 30 further includes a collar 50. Collar 50 is connected to and substantially encloses one end of tubular body 32. Collar 50 includes an aperture 52 sized to allow the telescopic sliding of adjustable leg 34 into and out of tubular body 32. Collar 50 houses and supports a locking mechanism 60 for securing adjustable leg 34 at a selected linear orientation with respect to tubular body 32. In the locked position, locking mechanism 60 allows for the transfer of loads from hook 35 to attachment lug 36.

Figures 9, 10:
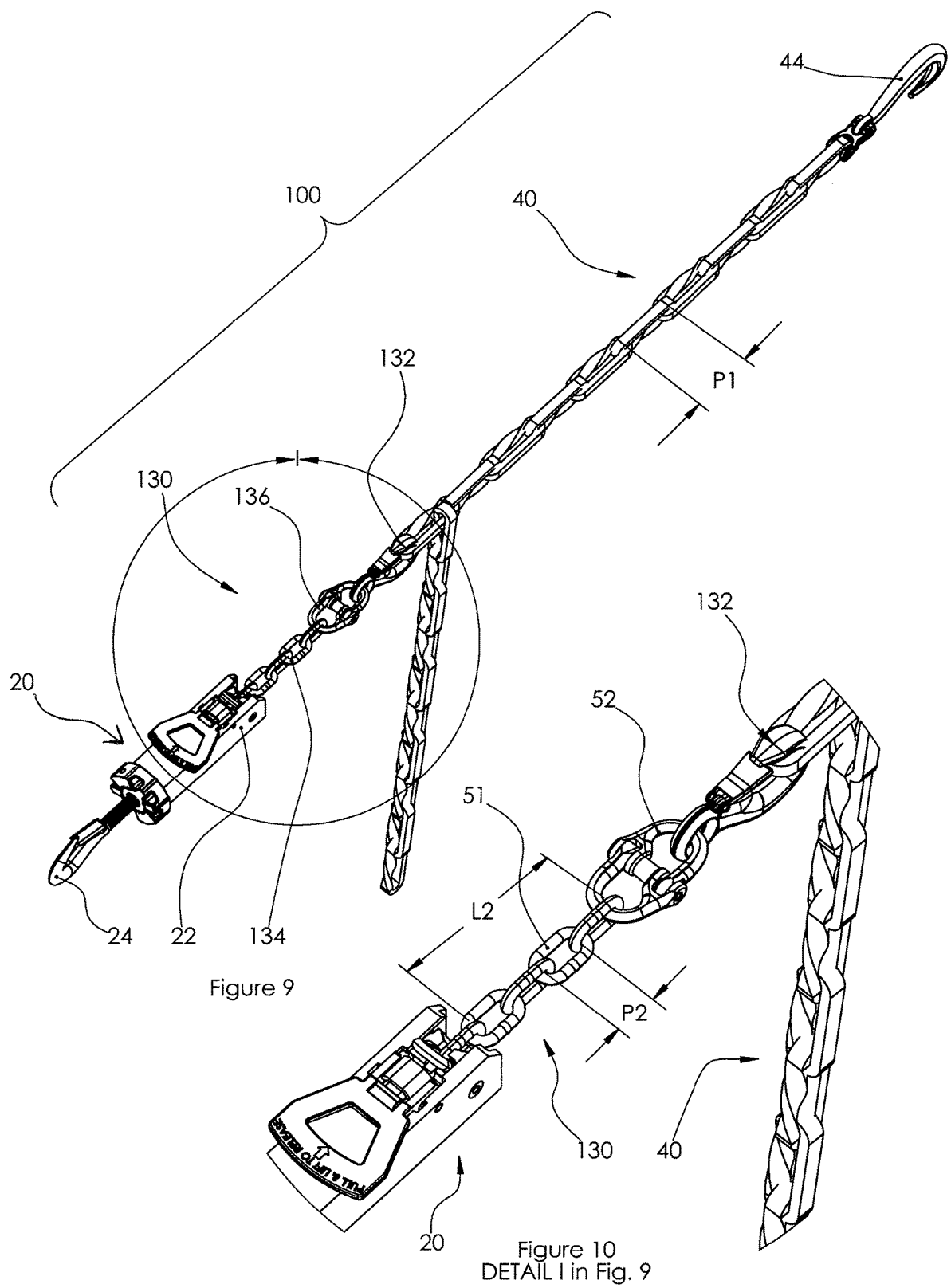
FIG. 9 is a perspective view of the initial installation position of a shortening chain assembly of the present invention.
FIG. 10 is an enlarged detail taken from FIG. 9.

As best seen in FIG. 5, locking mechanism 60 preferably includes a pair of opposing pivotably mounted levers 62a, 62b. Levers 62a, 62b are pivotably attached to collar 50 via pins 64a, 64b. Each of the levers includes a groove-engaging surface 66a, 66b. More particularly, levers 62a, 62b are sized and located to engage select grooves 37 as adjustable leg 34 is moved into and out of tubular body 32. Levers 62a, 62b are preferably biased to the locked position (as best seen in FIG. 9) via biasing springs 67a, 67b. The locked position is the position where the levers are engaged with the groove, thereby securing adjustable leg 34 with respect to tubular body 32. Levers 62a, 62b preferably include thumb-engaging surfaces 68a, 68b, which are engageable from the exterior of collar 50 (as best seen in FIG. 4) to allow the operator to pivot levers 62a, 62b to the released position wherein groove-engaging surfaces 66a, 66b are disengaged from groove 37 (as shown in FIG. 4), thereby allowing adjustable leg 34 to telescopically slide with respect to tubular body 34. Once the operator has displaced tubular body 34 towards load binder 20 to remove any slack in synthetic rope 40 (which causes adjustable leg 34 to telescopically slide within tubular body 34), the operator releases pressure from thumb-engaging surfaces 68a, 68b, which allows levers 62a, 62b to pivot back to the locked position via the biasing force exerted on the levers by biasing springs 67a, 67b.

Figure 8:
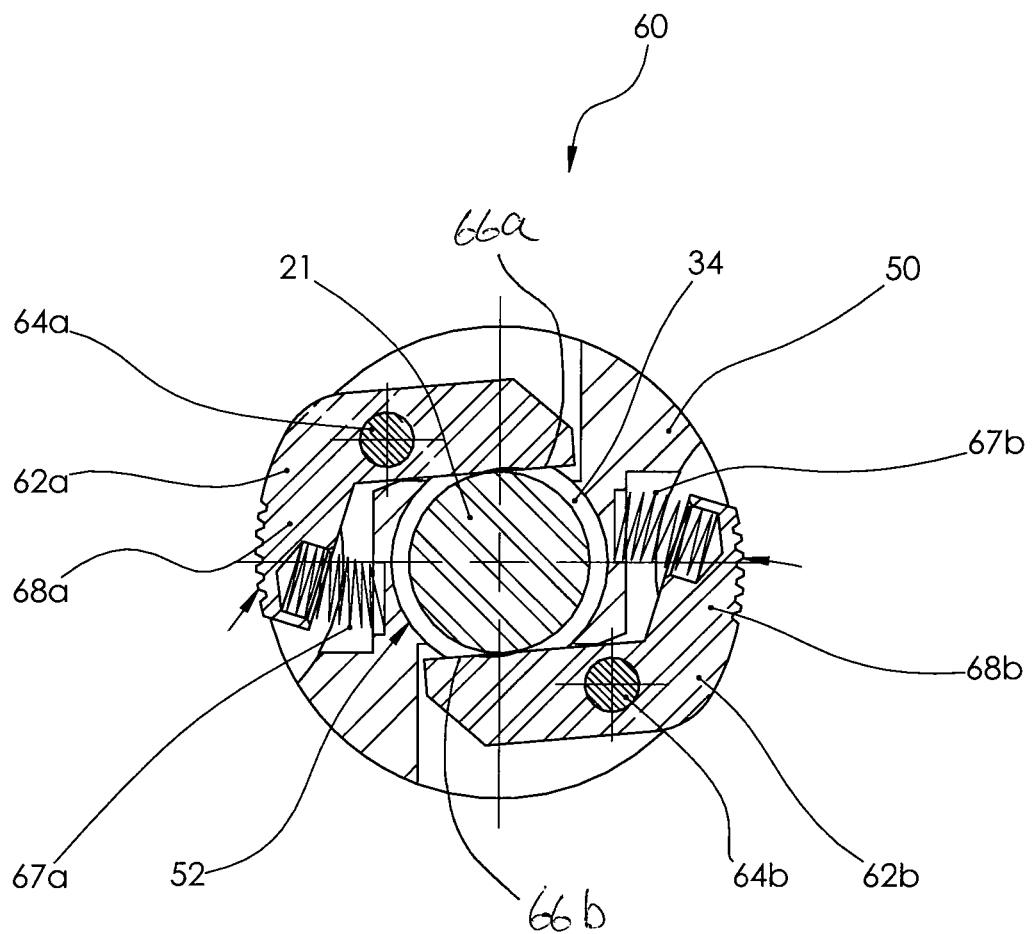
FIG. 8 is a cross-sectional view taken through lines H-H of FIG. 7.

FIGS. 6-8 show cargo securing system 10 after any initial slack has been removed/minimized from synthetic chain 40. As described hereinabove, this has been accomplished through the use of the novel length-adjusting coupling device 30. This has also been accomplished in a minimum amount of time and with minimum effort from the operator. Once the slack has been removed from the chain, the operator releases pressure from thumb-engaging surfaces, thereby allowing levers 62a, 62b to pivot back to the locked position as seen in FIG. 9. If necessary and/or desired, the operator can then use the available features of the conventional load binder to further pre-tension the synthetic chain. At this point, the operator can then move the locking lever of load binder 20 to the locked position, thereby imparting the desired level of tension into synthetic chain 40 and completing the securement operation.

A typical cargo securing operation will now be described. In this regard, the procedure for using a synthetic chain to secure cargo is similar to the procedures used with metal chains. To begin, the operator must connect hooks 24 and 44 of cargo securing system 10 at the appropriate locations depending on the type of cargo to be secured and the type of transportation vessel. Length-adjusting coupling device 30 is then connected to load binder 20, and adjustable leg 34 is fully extended from tubular body 32 to provide a maximum distance L1. The operator then connects hook 35 to the most distant link of synthetic chain 40 which may be reached by hook 35. The operator then applies pressure to thumb-engaging surfaces 68a, 68b to release levers 62a, 62b from engagement with grooves 37, and simultaneously pulls tubular body 34 towards load binder 22 to remove any slack in synthetic chain 40. While holding tubular body 34 in the same orientation, the operator releases pressure from thumb-engaging surfaces 68a, 68b, thereby allowing release levers 62a, 62b to engage with one of grooves 37 and lock adjustable leg 34 to tubular body 32. If necessary and/or desired, the operator can then use the available features of load binder 20 to further pre-tension synthetic chain 40. Finally, the locking lever of load binder 20 is moved to the locked position, thereby imparting the desired level of tension into synthetic chain 40 to complete the securement operation.

Figure 11:
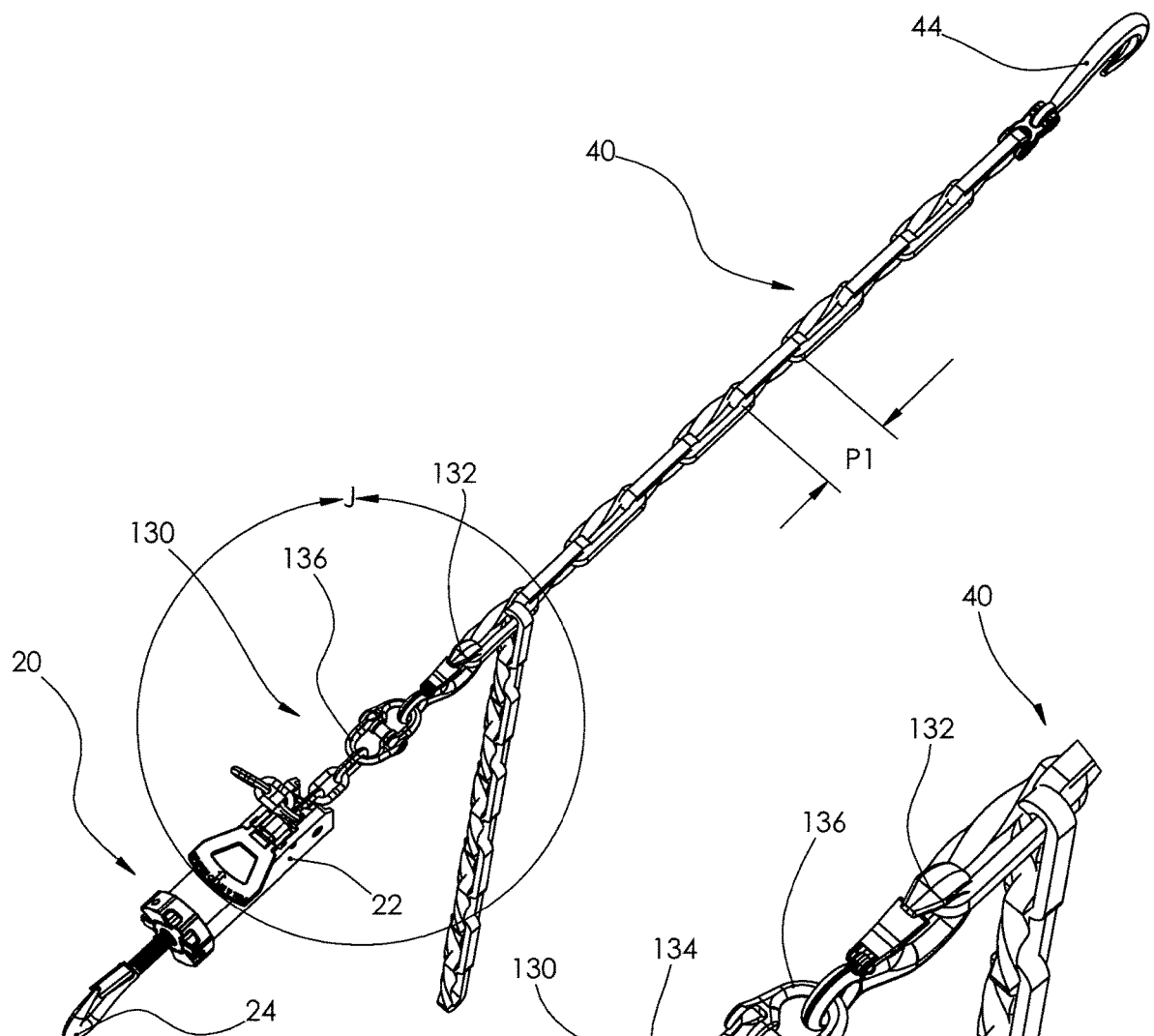
FIG. 11 is a perspective view of the shortening chain assembly of FIG. 9 after the initial slack has been removed/minimized from the synthetic chain.
Figure 12:
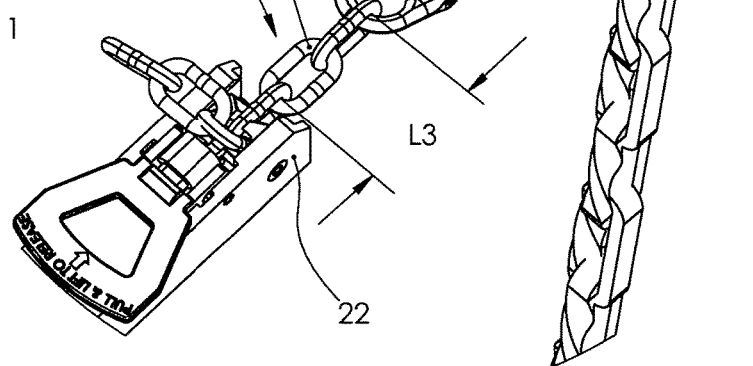
FIG. 12 is an enlarged detail taken from FIG. 11.

A second embodiment of the present invention is shown in FIGS. 10-12. As shown, cargo securing system 100 also includes load binder 20 and synthetic chain 40. However, length-adjusting-coupling device 30 is replaced by a shortening chain assembly 130 in this embodiment. Chain assembly 130 includes a hook 132 and a length of metal chain 134. In one preferred embodiment, hook 132 is coupled to metal chain 134 via a coupler 136. As best seen in FIG. 11, metal chain 134 has a pitch P2 and an adjustable length L2. It is been discovered herein that adjustable length L2 should be equal to or slightly greater than pitch P1. It has also been discovered herein that pitch P2 is preferably about one fourth of pitch P1.

The operation of cargo securing system 100 it is similar to that described hereinabove with respect to cargo securing system 10. Following the connection of hooks 24 and 44 at the appropriate locations, the operator uses shortening chain assembly 130 to complete the connection. In particular, the operator will identify a link of synthetic chain 40 which is engageable with hook 132 when chain assembly 130 is oriented as shown in FIG. 11. The operator will then remove the free end of metal chain 134 from the chain-engaging pocket 26 of load binder 20, and pull synthetic chain 40 in a direction towards load binder 20. The operator will then select the appropriate link of metal chain 134 to connect with chain-engaging pocket 26 of load binder 20 (length L3), thereby removing any initial slack in synthetic chain 40. If necessary and/or desired, the operator can then use the available features of load binder 20 to further pre-tension synthetic chain 20. Finally, the locking lever of load binder 20 is moved to the locked position, thereby imparting the desired level of tension into synthetic chain 40.

It is contemplated herein that synthetic chain 40 and shortening chain assembly 130 can be sold together as a kit of parts, such kit usable with conventional and already existing load binders. The kits may be configured to replace metal tiedown chains for specific applications, and as such, the shortening chain assembly would be sized and configured to cooperate with the specific load binder used in that application.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A length-adjusting coupling device for connecting a load binder to a section of chain, said load binder including a chain-engaging notch, said chain having a link pitch P1, said coupling device comprising:
   a) an elongate tubular body having first and second ends;
   b) a hook connected to said first end of said elongate body;
   c) an adjustable leg having first and second ends and being sized to telescopically travel within said elongate body, said first end of said leg including an attachment lug configured to engage said chain-engaging notch of said load binder, said adjustable leg having a stroke length L1; and d) a locking mechanism for fixing said leg with respect to said body at a plurality of telescoped orientations and for transferring loads from said hook to said attachment lug;

further comprising a collar connected to and enclosing said second end of said elongate body;

wherein said locking mechanism includes:

a) an engagement member cooperating with said collar; and b) a plurality of locking stops positioned along the length of said adjustable leg; and wherein said locking stops include a plurality of evenly spaced circumferentially-extending grooves formed along the length of said adjustable leg, each of said grooves defining a distance T extending in a direction along the length of said adjustable leg; and wherein said stroke length L1 is equal to or slightly greater than said pitch P1, and wherein said distance T is equal to or less than one fourth of pitch P1.

2. The coupling device according to claim 1, wherein said collar includes an aperture sized to allow said adjustable leg to telescopically travel within said body, and wherein said engagement member is supported by said collar.

3. The coupling device according to claim 2, wherein said collar includes a pair of pivotally mounted levers, each of said levers having a thumb-engaging shoulder for pivoting said levers, each of said levers further including an engagement shoulder for engaging one of said grooves on said adjustable leg, said levers movable between a first released position wherein said adjustable leg telescopically slides within said elongate body and a second locked position wherein said engagement shoulder is positioned within one of said grooves located on said adjustable leg thereby locking said adjustable leg with respect to said elongate body.

4. The coupling device according to claim 1, wherein said hook is pivotally connected to said first end of said elongate body.

5. A length-adjusting coupling device for connecting a load binder to a section of chain, said load binder including a chain-engaging notch, said coupling device comprising:

a) an elongate tubular body having first and second ends;

b) a hook connected to said first end of said elongate body;

c) an adjustable leg having first and second ends and being sized to telescopically travel within said elongate body, said first end of said leg including an attachment lug configured to engage said chain-engaging notch of said load binder; and d) a locking mechanism for fixing said leg with respect to said body at a plurality of telescoped orientations and for transferring loads from said hook to said attachment lug;

further comprising a collar connected to and enclosing said second end of said elongate body; and wherein said locking mechanism includes:

a) an engagement member cooperating with said collar; and b) a plurality of locking stops positioned along the length of said adjustable leg;

wherein said locking stops include a plurality of evenly spaced circumferentially-extending grooves formed along the length of said adjustable leg;

wherein said collar includes an aperture sized to allow said adjustable leg to telescopically travel within said body, and wherein said engagement member is supported by said collar; and wherein said collar includes a pair of pivotally mounted levers, each of said levers having a thumb-engaging shoulder for pivoting said levers, each of said levers further including an engagement shoulder for engaging one of said grooves on said adjustable leg, said levers movable between a first released position wherein said adjustable leg telescopically slides within said elongate body and a second locked position wherein said engagement shoulder is positioned within one of said grooves located on said adjustable leg thereby locking said adjustable leg with respect to said elongate body.

* * * * *